Feb. 3, 1931.   H. C. ALLEN   1,791,258
COLTER GUARD
Filed June 20, 1929
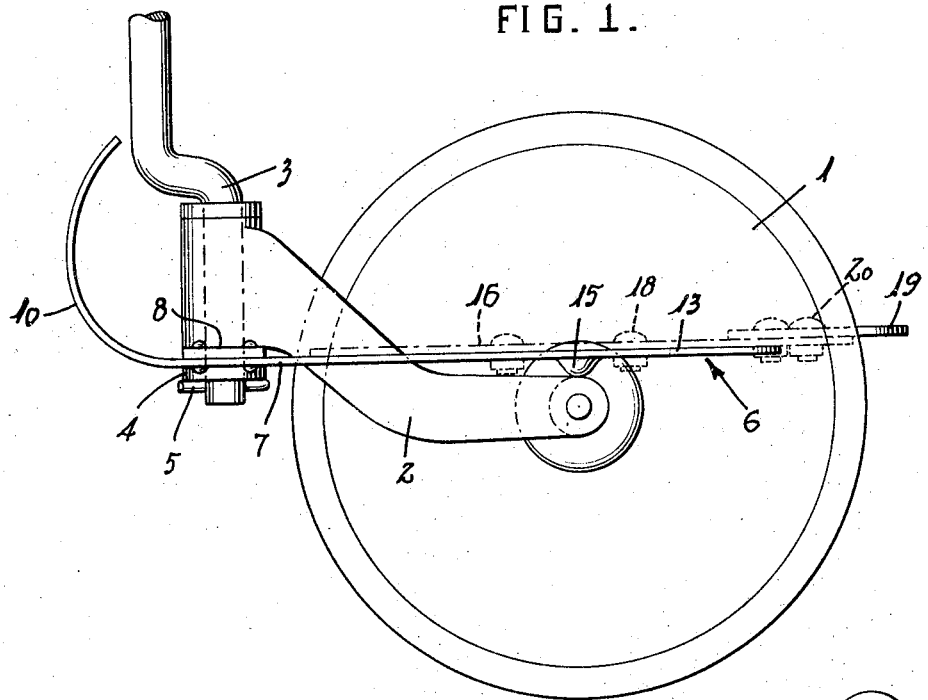
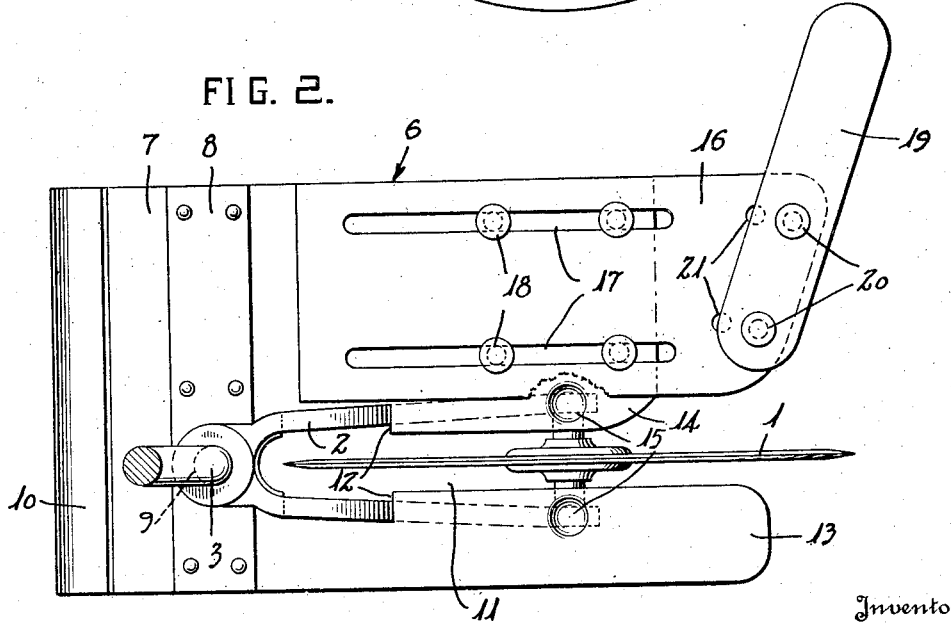
Inventor:
Harold C. Allen
By Monroe E. Miller
Attorney.

Patented Feb. 3, 1931

1,791,258

UNITED STATES PATENT OFFICE

HAROLD C. ALLEN, OF CHAMPAIGN, ILLINOIS

COLTER GUARD

Application filed June 20, 1929. Serial No. 372,378.

The present invention relates to guards and shields for plow colters, and aims to provide a novel device of that kind which will prevent the accumulation of corn stalks, weeds, trash and other foreign matter under or in front of the plow, and which will hold such foreign matter down so as to be plowed under the turned ground.

Another object of the invention is the provision of a guard of novel form and construction for convenient application to the colter of a walking, riding or tractor plow.

A further object is the provision of a colter guard having novel provisions for adjustment in order that the device may be applied to different plows.

It is also an object of the invention to provide a colter guard which is simple and inexpensive in construction, as well as being practical and efficient in use.

With the foregoing and other objects in view, which will be apparent as the description proceeds, the invention resides in the construction and arrangement of parts, as hereinafter described and claimed it being understood that changes can be made within the scope of what is claimed, without departing from the spirit of the invention.

The invention is illustrated in the accompanying drawing, wherein—

Figure 1 is a side elevation of the guard as applied to a colter.

Fig. 2 is a plan view thereof, a portion being broken away.

The plow colter illustrated is of the conventional kind, and comprises a colter disk 1 mounted for rotation within a trailing fork 2 which is mounted for turning movement on the depending shank 3 of the plow. A collar 4 is secured on the shank by a set screw or otherwise for holding the fork thereon, and a cotter pin 5 is preferably secured through said shank below the collar to prevent loss thereof.

The guard or shield 6 is disposed in a horizontal position, and comprises the sheet metal plate 7 which preferably has a transverse reinforcing bar 8 secured thereon. Said plate and bar have an aperture 9 receiving the shank 3, and the plate is disposed above the collar 4 for conveniently attaching the guard to said shank.

The forward end portion of the plate 7 is bent or curved upwardly, as at 10, in order to deflect corn stalks, weeds and trash downwardly under the guard, and to prevent the guard from catching corn stalks and the like.

The plate 7 has a longitudinal rearwardly opening slot 11 to receive the colter disk 1, and said plate has notches or cut-out portions 12 at the opposite edges of the slot for the passage of the arms of the fork 2.

The plate 7 has a narrow wing 13 at the left side of the colter disk and has a wide wing 14 at the right side of said disk, and said wings are seated on the arms of the fork in rear of the notches 12. If desired, said wings may have lugs 15 or other portions to seat on the arms of the fork.

An extension plate 16 overlaps the wing 14 and has longitudinal slots 17 receiving clamping bolts 18 engaging through the wing 14, thereby permitting the plate 16 to be adjusted forwardly and rearwardly so as to project different distances from the rear end of the wing 14 as an extension thereof.

A tail piece 19 is secured by bolts 20 or other securing elements on the rear end portion of the plate 16 and projects beyond the right hand edge of said plate. The plate 16 has apertures 21 to receive the bolts 20 in order that the tail piece 19 may be adjusted to different positions. The tail piece 19, which can be made of heavy durable sheet iron, is capable of adjustment forwardly for tall weeds, cornstalks, trash, etc., and back closer to the mold board for turning soil for small weeds, clover, trash, etc. The tail piece 19 is adapted to hold down all weeds, etc. in the bottom of the furrow until the same are completely covered.

The adjustments of the extension plate 16 and tail piece 19 enable the guard to accommodate different plows.

The guard will depress corn stalks, weeds, trash and other foreign matter, to prevent same accumulating under or in front of the plow, and the ground turned by the plow will cover such matter, thereby disposing of and concealing the trash and other foreign matter, and eliminating such pests as the corn borer.

The guard does not cause side draft, and prevents choking of the plow by accumulations of trash. The guard does not add to the draft required in pulling the plow, and it is also unnecessary to plow deeper than usual.

The tail piece 19 extends close to the ground which is being turned by the plow in order to hold corn stalks and other foreign matter down so as to be covered by the turned ground.

Having thus described the invention, what is claimed as new is:

1. A colter guard comprising a plate having a rearwardly opening slot to receive a colter disk, and providing opposite wings, and an extension plate adjustably mounted on one of said wings whereby said plate can be adjusted forwardly and rearwardly so as to project different distances from the rear end of said last mentioned wing.

2. A colter guard comprising a plate having a rearwardly opening slot to receive a colter disk, and providing opposite wings, an extension plate adjustably mounted on one of said wings, and a tail piece adjustably mounted on said extension plate whereby said tail piece can be adjusted to different positions to hold down weeds of different height.

3. A colter guard comprising a plate having a rearwardly opening slot to receive a colter disk, and providing opposite wings, and a tail piece adjustably mounted on one of said wings whereby said tail piece can be adjusted to different positions to hold down weeds of different height.

In testimony whereof I hereunto affix my signature.

HAROLD C. ALLEN.